United States Patent
Kim et al.

(10) Patent No.: US 9,293,744 B2
(45) Date of Patent: Mar. 22, 2016

(54) RECHARGEABLE BATTERY

(75) Inventors: Yong-Sam Kim, Yongin-si (KR);
Jang-Hyun Song, Yongin-si (KR);
Tai-Sun You, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 728 days.

(21) Appl. No.: 13/491,972

(22) Filed: Jun. 8, 2012

(65) Prior Publication Data

US 2013/0122355 A1     May 16, 2013

(30) Foreign Application Priority Data

Nov. 14, 2011   (KR) ........................ 10-2011-0118475

(51) Int. Cl.
| | |
|---|---|
| *H01M 2/30* | (2006.01) |
| *H01M 2/02* | (2006.01) |
| *H01M 2/22* | (2006.01) |
| *H01M 2/26* | (2006.01) |

(52) U.S. Cl.
CPC ................ *H01M 2/027* (2013.01); *H01M 2/22* (2013.01); *H01M 2/263* (2013.01)

(58) Field of Classification Search
CPC ........ H01M 2/027; H01M 2/22; H01M 2/263
USPC .................................................. 429/179, 163
See application file for complete search history.

(56) References Cited

U.S. PATENT DOCUMENTS

| | | | |
|---|---|---|---|
| 2005/0214640 A1* | 9/2005 | Kim ............................. | 429/161 |
| 2009/0239139 A1* | 9/2009 | Kozuki et al. ................ | 429/161 |
| 2009/0317712 A1 | 12/2009 | Kim et al. | |
| 2010/0233521 A1* | 9/2010 | Byun et al. ...................... | 429/72 |
| 2011/0027644 A1 | 2/2011 | Kiyama | |

FOREIGN PATENT DOCUMENTS

| | | |
|---|---|---|
| JP | 2002-075322 | 3/2002 |
| KR | 10-2009-0132492 | 12/2009 |
| KR | 1020100002633 | 1/2010 |
| KR | 1020100134110 | 12/2010 |

* cited by examiner

*Primary Examiner* — Jonathan Jelsma
*Assistant Examiner* — Rashid Alam
(74) *Attorney, Agent, or Firm* — Lee & Morse, P.C.

(57) ABSTRACT

A rechargeable battery includes an electrode assembly including a first electrode, a second electrode, and a separator provided between the first electrode and the second electrode; a first current collecting plate electrically connected to the first electrode; a second current collecting plate electrically connected to the second electrode; and a case for receiving the electrode assembly, the first current collecting plate, and the second current collecting plate, wherein the first current collecting plate is electrically connected to an inner wall of the case.

17 Claims, 9 Drawing Sheets

RECHARGEABLE BATTERY

BACKGROUND

1. Field

The embodiments relate generally to a rechargeable battery.

2. Description of the Related Art

Unlike a primary battery that is incapable of being recharged, a rechargeable battery can be repeatedly charged and discharged. A small-capacity rechargeable battery has been used for a small electronic device such as a mobile phone, a laptop computer, and a camcorder. A large-capacity rechargeable battery has been used as a power source for driving a motor of a hybrid vehicle.

Recently, a high power rechargeable battery has been introduced. The high power rechargeable battery uses a high energy density non-aqueous electrolyte. The high power rechargeable battery includes a plurality of rechargeable batteries coupled in series. Such a high power rechargeable battery has been used for an apparatus requiring high power, for example, for driving a motor of an electric vehicle.

The above information disclosed in this Background section is only for enhancement of understanding of the background of the described technology and therefore it may contain information that does not form the prior art that is already known in this country to a person of ordinary skill in the art.

SUMMARY

A rechargeable battery including an electrode assembly including a first electrode, a second electrode, and a separator provided between the first electrode and the second electrode, a first current collecting plate electrically connected to the first electrode, a second current collecting plate electrically connected to the second electrode, and a case for receiving the electrode assembly, the first current collecting plate, and the second current collecting plate, the first current collecting plate being electrically connected to an inner wall of the case.

A weld may fix and electrically connect the first current collecting plate to the inner wall of the case. A surface of the first current collecting plate may include a welded protrusion, the welded protrusion being welded to the inner wall of the case. The first current collecting plate may include at least two welded protrusions. The at least two welded protrusions may have a same shape. The welded protrusion may include a bend in the first current collecting plate, the bend protruding toward the inner wall of the case. The welded protrusion may have a cross-section having a square, triangular, or circular shape.

The first current collecting plate may include an elastic portion, the elastic portion being moveable with respect to a remaining portion of the first current collecting plate, and a welded protrusion protruding from a surface of the elastic portion, the welded protrusion being attached to the inner wall of the case. The elastic portion may include: a first portion that is incised on a side of the first current collecting plate and that protrudes in the inner wall direction of the case, a second portion that is incised on a side of the first current collecting plate at a position near the first portion and that protrudes in the inner wall direction of the case, and the welded protrusion protrudes at the surfaces of the first portion and the second portion. The welded protrusion may include a bend in the first portion and the second portion, the bend protruding toward the inner wall of the case. The welded protrusion may have a square, triangular, circular shaped cross-section. A weld may connect the welded protrusion to the inner wall of the case. The first electrode may be a positive electrode, and the second electrode may be a negative electrode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
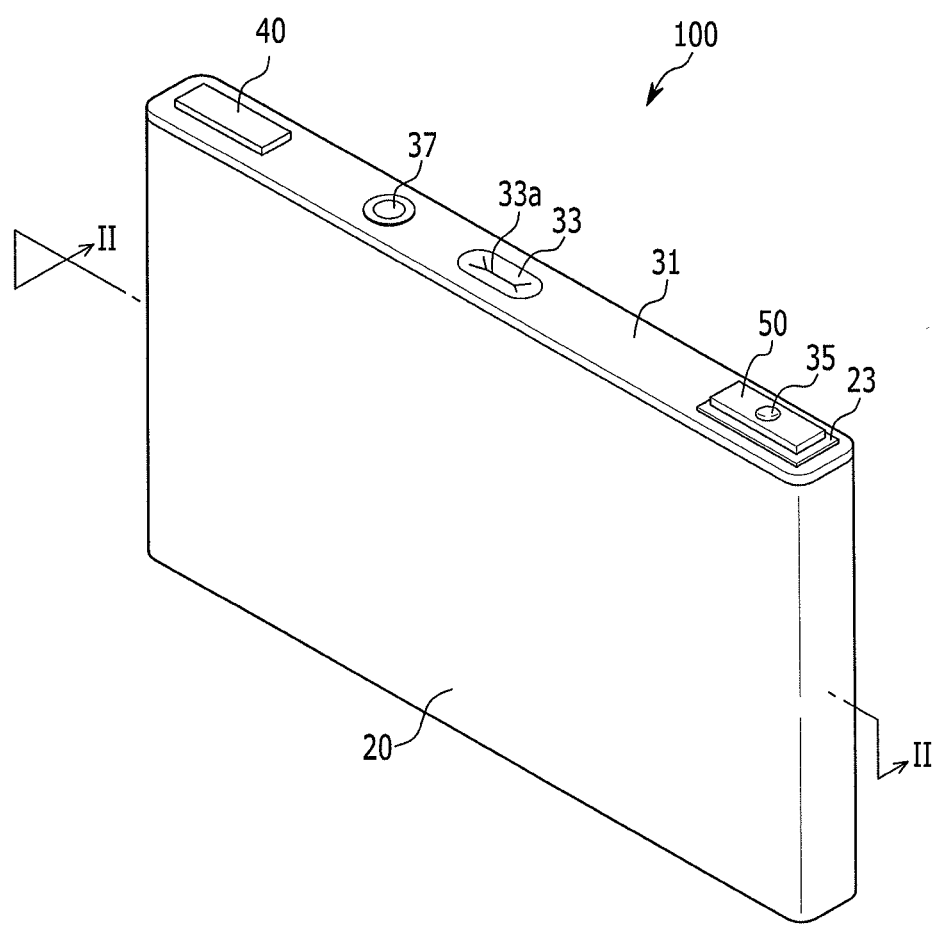
FIG. 1 illustrates a perspective view of a rechargeable battery according to a first exemplary embodiment.

Korean Patent Application No. 10-2011-0118475, filed on Nov. 14, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
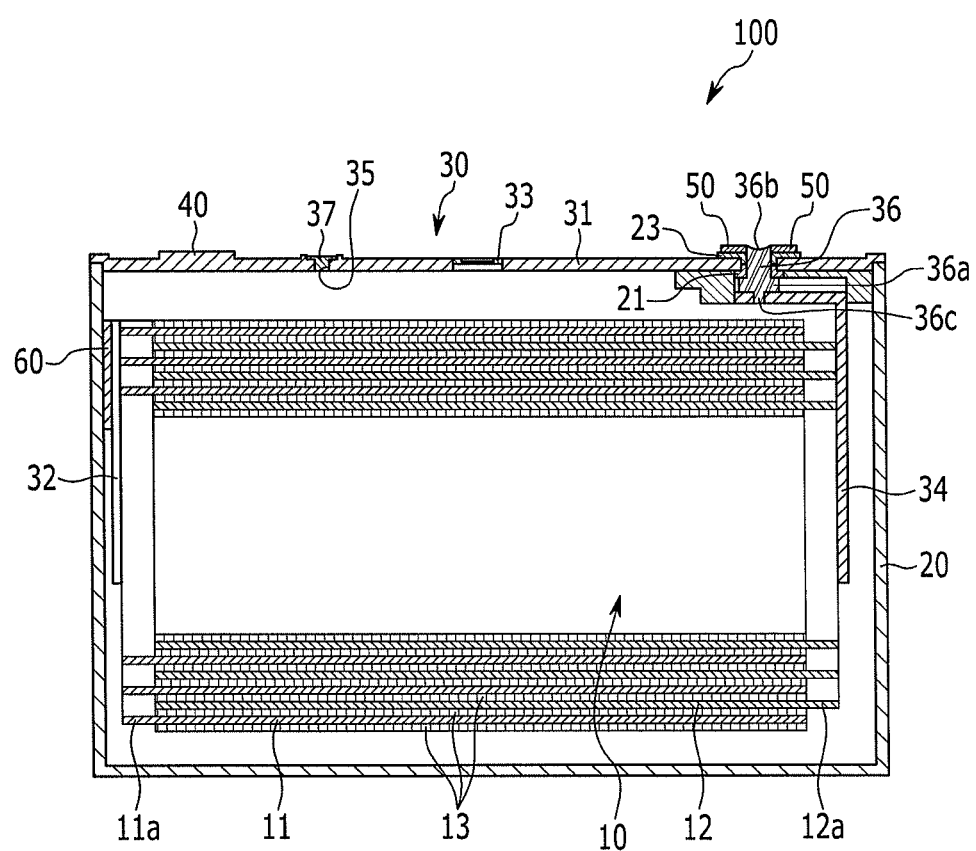
FIG. 2 illustrates a cross-sectional view with respect to a line II-II shown in FIG. 1.

FIG. 1 illustrates a perspective view of a rechargeable battery according to a first exemplary embodiment. FIG. 2 illustrates a cross-sectional view with respect to a line II-II shown in FIG. 1.

As shown in FIG. 1 and FIG. 2, the rechargeable battery 100 may include an electrode assembly 10 having a positive electrode 11, a negative electrode 12, and a separator 13, a first current collecting plate 32, a second current collecting plate 34, and a case 20. The first current collecting plate 32 or the second current collecting plate 34 may be electrically connected to an inner wall of the case 20. Hereinafter, the first current collecting plate 32 will be referred to as a positive current collecting plate and the second current collecting plate 34 will be referred to as a negative current collecting plate. The positive current collecting plate 32 may be electrically connected to the inner wall of the case 20. However, the embodiments are not restricted to such a configuration, and the negative current collecting plate 34, rather than the positive current collecting plate 32, may be electrically connected to the inner wall of the case 20. According to the present embodiments, the positive current collecting plate 32 may be connected to the case 20 through welding.

According to an implementation, the positive current collecting plate 32 may include first and second longitudinal sides 32a and 32b, and a third horizontal side 32c that extends between and connects the first and second longitudinal sides 32a and 32b. The third horizontal side 32c may have a length that is shorter than that of the first and second longitudinal sides 32a and 32b.

The rechargeable battery 100 may be, for example, an angular lithium ion secondary battery, a lithium polymer battery, or a cylindrical battery.

The positive electrode 11 and the negative electrode 12 may include a coated region and uncoated regions 11a and 12a. The coated region may be formed by coating an active material on a current collector. The current collector may include a thin-plate metal foil. The uncoated regions (11a and 12a) may include portions of the current collector on which the active material is not coated. The positive uncoated region 11a may be on a first end of the positive electrode 11. The negative uncoated region 12a may be on a second end of the negative electrode 12. Hereinafter, the positive electrode 11 may be referred to as a first electrode and the negative electrode 12 may be referred to as a second electrode.

The positive electrode 11 and the negative electrode 12 may be stacked together with the separator 13, which is an insulator, therebetween. Once stacked together, the positive electrode 11, the negative electrode 12, and the separator 13, may be spirally wound by using a winding roll to form a jellyroll type of electrode assembly 10. The electrode assembly 10 may be compacted, i.e., compressed, by a device such as a press, to facilitate installation of the electrode assembly 10 in the case 20.

The case 20 may be formed with rectangular parallelepiped metal, and an opening may be formed on one side of the case 20. A cap assembly 30 may include a cap plate 31 combined with the opening of the case 20, a positive electrode terminal 40 that protrudes outside the cap plate 31 and is electrically connected to the positive electrode 11, a negative terminal 50 that protrudes outside the cap plate 31 and is electrically connected to the negative electrode 12, and a vent member 33. A notch 33a may be formed in the vent member 33, which may be broken in response to a predetermined internal pressure.

The cap plate 31 may be a thin plate and may include, an electrolyte injection opening 35 for injecting an electrolyte solution therethrough. A sealing stopper 37 for sealing the electrolyte injection opening 35 may be installed in the cap plate 31.

The positive current collecting plate 32 may be welded to the positive uncoated region 11a. The negative current collecting plate 34 may be welded to the negative uncoated region 12a.

The positive current collecting plate 32 may be electrically connected to the inner wall of the case 20 through welding. A welded protrusion 60 may protrude from the surface of the positive current collecting plate 32. The welded protrusion 60 may be welded to the inner wall of the case 20.

Figure 3:
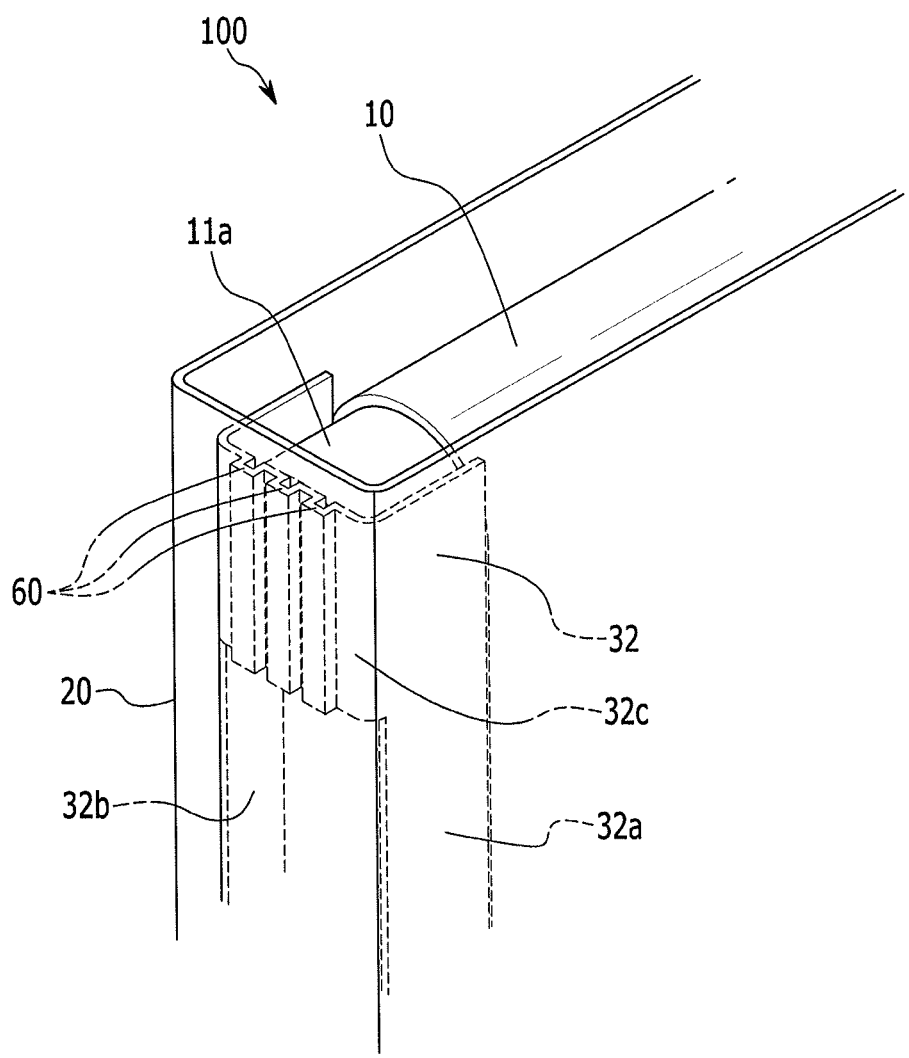
FIG. 3 illustrates a partial perspective view showing a state in which a positive current collecting plate, according to a first exemplary embodiment, is combined with an inner wall of a case by a welded protrusion.
Figure 4:
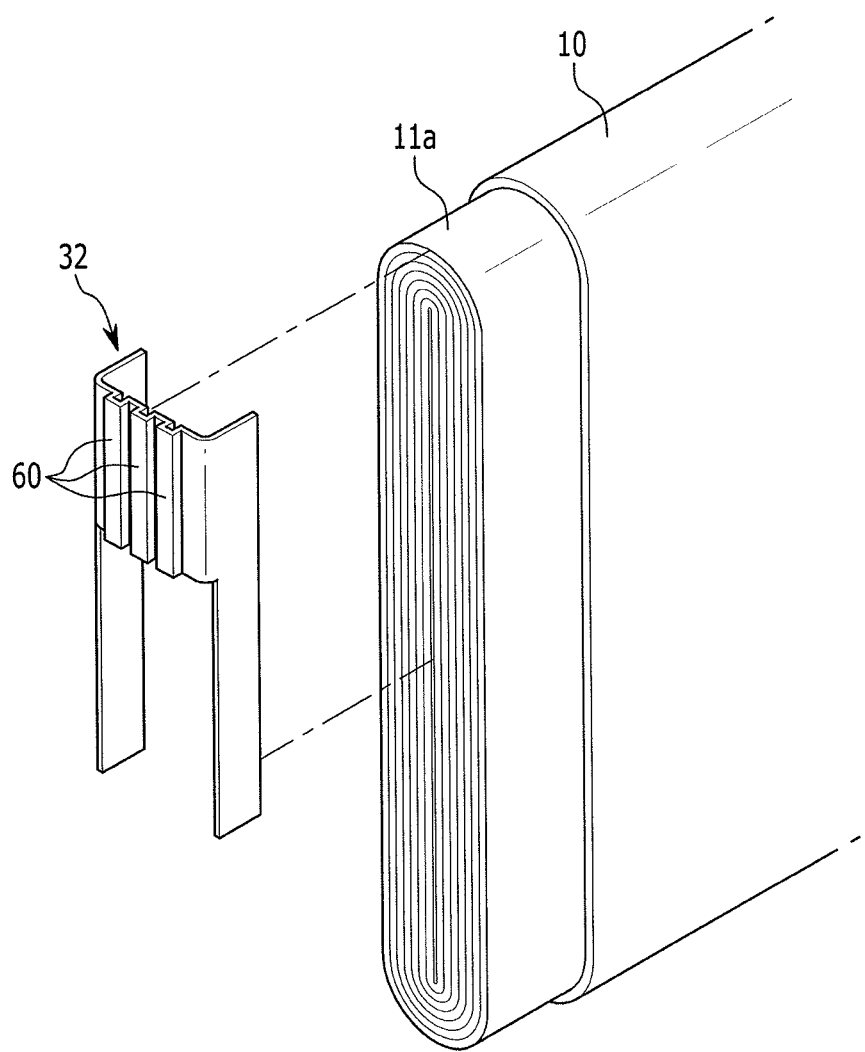
FIG. 4 illustrates a perspective view showing a state in which a welded protrusion protrudes from the positive current collecting plate shown in FIG. 3.

FIG. 3 illustrates a partial perspective view of the welded protrusion 60 of the positive current collecting plate 32 coupled to an inner wall of the case 20, according to a first exemplary embodiment. FIG. 4 illustrates a perspective view of the welded protrusion 60 protruding from the positive current collecting plate 32, shown in FIG. 3.

As shown in FIG. 3 and FIG. 4, the welded protrusion 60 may protrude towards the inner wall of the case 20, along a length of the positive current collecting plate 32.

The welded protrusion 60 may include one or more protrusions, e.g., rectangular protrusions, extending from a surface of the positive current collecting plate 32. A groove or depression may extend vertically between two adjacent welded protrusions 60. The welded protrusion 60 may be integrally formed with the positive current collecting plate 32 or separately coupled to the surface of the positive current collecting plate 32.

At least two welded protrusions 60 may protrude toward the inner wall of the case 20. The welded protrusions 60 may have a quadrangular, e.g., rectangular or square-shaped, side. The welded protrusions 60 protruding from the surface of the positive current collecting plate 32 may contact the inner wall of the case, so as to increase contact resistance between the welded protrusion 60 and the inner wall of the case 20, and thereby improve welding efficiency.

Figure 5:
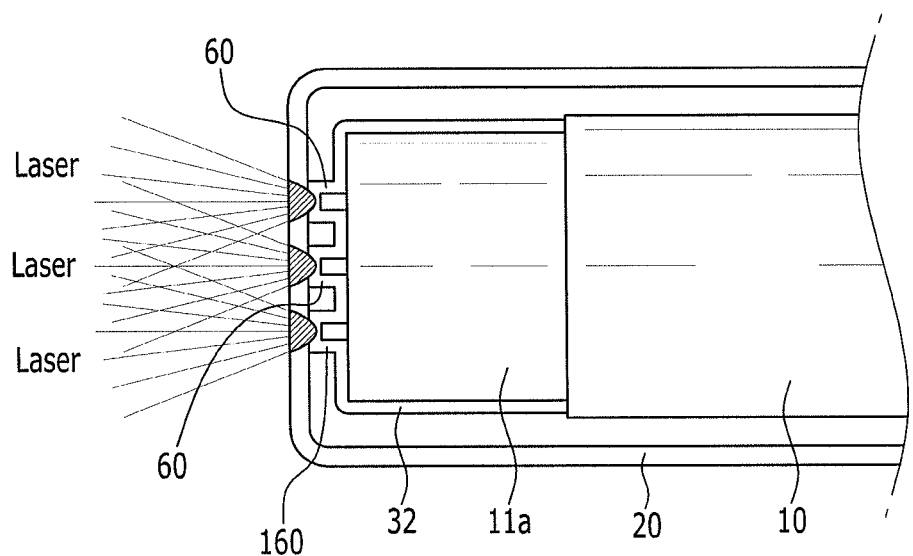
FIG. 5 illustrates a cross-sectional view of a rechargeable battery according to a second exemplary embodiment.

FIG. 5 illustrates a stage in a process of laser welding a welded protrusion 60 to the case 20.

As shown in FIG. 5, when the positive current collecting plate 32 is inserted into the case 20, a protruding end of the welded protrusion 60 may contact an inner surface of the case 20.

Once the welded protrusion 60 is in contact with the inner surface of the case 20, a laser welding process may be performed in which laser beams are directed toward the case 20 from a position outside of the case 20. The case 20 may be stably coupled with the welded protrusion 60 by the laser welding. The laser welding may be performed in the length direction of the case 20.

As described above, when the welded protrusion 60 is coupled to the inner wall of the case 20 by laser welding, the positive current collecting plate 32, the case 20, and the positive electrode terminal 40 may be electrically connected to each other. The welded protrusion 60 may facilitate transferring heat that is inside the rechargeable battery 100 outside of the case 20.

Referring to FIG. 2, the bottom of the negative current collecting plate 34 may be connected to the negative uncoated region 12a through welding and the top thereof may be connected to a negative terminal column 36 through welding to electrically connect the negative electrode 12 and the negative terminal column 36. A flange 36a contacting the negative current collecting plate 34 may be formed on one end of the negative terminal column 36, and an inserter 36b may be inserted into the negative terminal 50, which is formed on the opposite end of the negative terminal column 36. A protrusion 36c may extend within the negative current collecting plate 34 and may be secured thereto by welding. The protrusion 36c may be formed below the flange 36a.

While in the cap plate 31 and the negative terminal 50, the top and bottom of the negative terminal column 36 may be pressurized to be fixed to the cap plate 31 and the negative terminal 50. A first gasket 21 for insulation may be provided between the negative terminal column 36 and the cap plate 31, and a second gasket 23 for insulation may be provided between the negative terminal 50 and the cap plate 31.

According to some embodiments, the negative current collecting plate 34 and the negative terminal column 36 can be made of copper.

Figure 6:
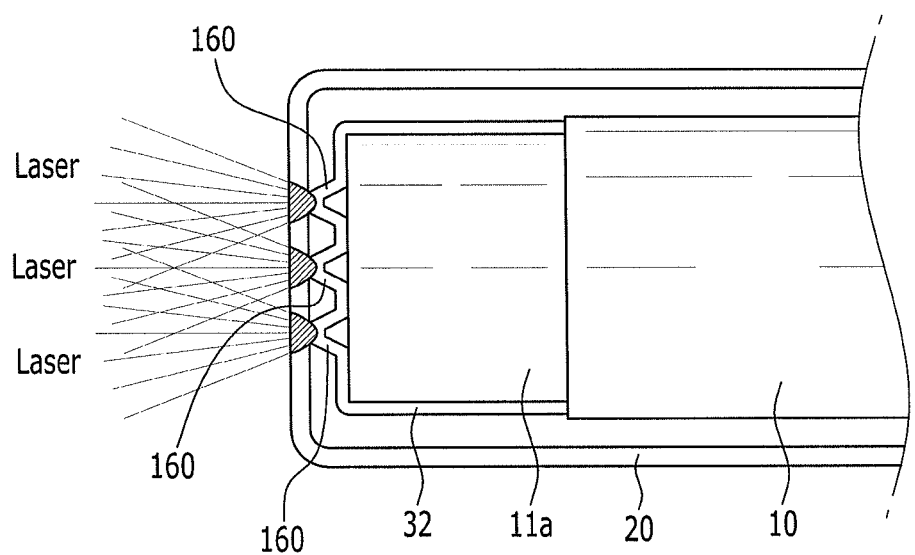
FIG. 6 illustrates a welded protrusion that protrudes from a positive current collecting plate according to the second exemplary embodiment.

FIG. 6 illustrates a welded protrusion that protrudes from a positive current collecting plate according to a second exemplary embodiment. Components of the second exemplary embodiment having the same reference numerals as the embodiment illustrated in FIG. 1 to FIG. 5 are the same and have the same functions. A description of the same components will not be repeated.

As shown in FIG. 6, a welded protrusion 160 may protrude from the positive current collecting plate 32. Unlike the welded protrusion 60 of the first exemplary embodiment, the welded protrusion 160 may be triangular. The welded protrusion 160 may be formed by bending the positive current collecting plate 32 toward the inner wall of the case 20.

Figure 7:
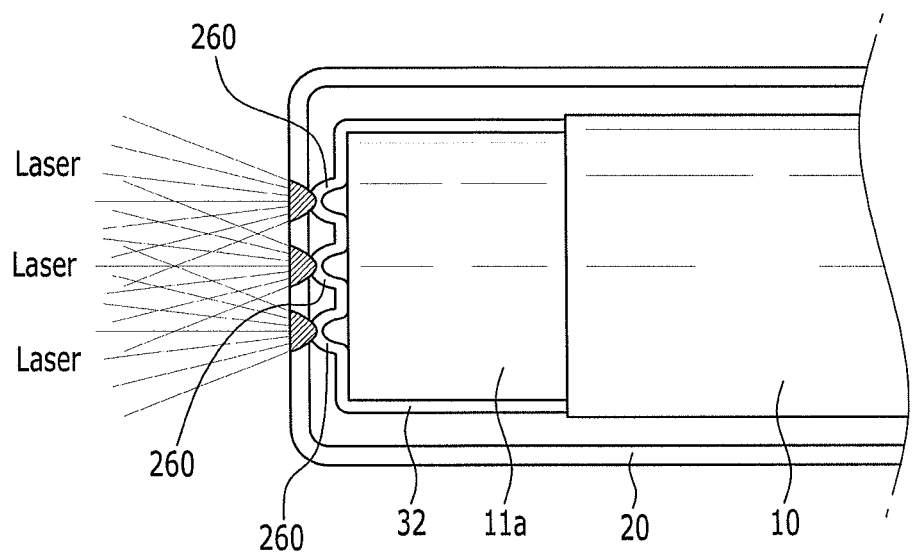
FIG. 7 illustrates a top plan view of a welded protrusion that protrudes from a positive current collecting plate according to a third exemplary embodiment.

FIG. 7 illustrates a top plan view of a welded protrusion protruding from a positive current collecting plate according to a third exemplary embodiment. Components of the third exemplary embodiment having the same reference numerals as the embodiments illustrated in FIG. 1 to FIG. 6 are the same members and have the same functions. A description of the same components will not be repeated.

As shown in FIG. 7, the welded protrusion 260, according to the third exemplary embodiment, may protrude from the positive current collecting plate 32. A cross-section of the welded protrusion 260 may have a circular shape, e.g., arc-shape. The welded protrusion 260 may be formed by bending the positive current collecting plate 32 toward the inner wall of the case 20.

Figure 8:
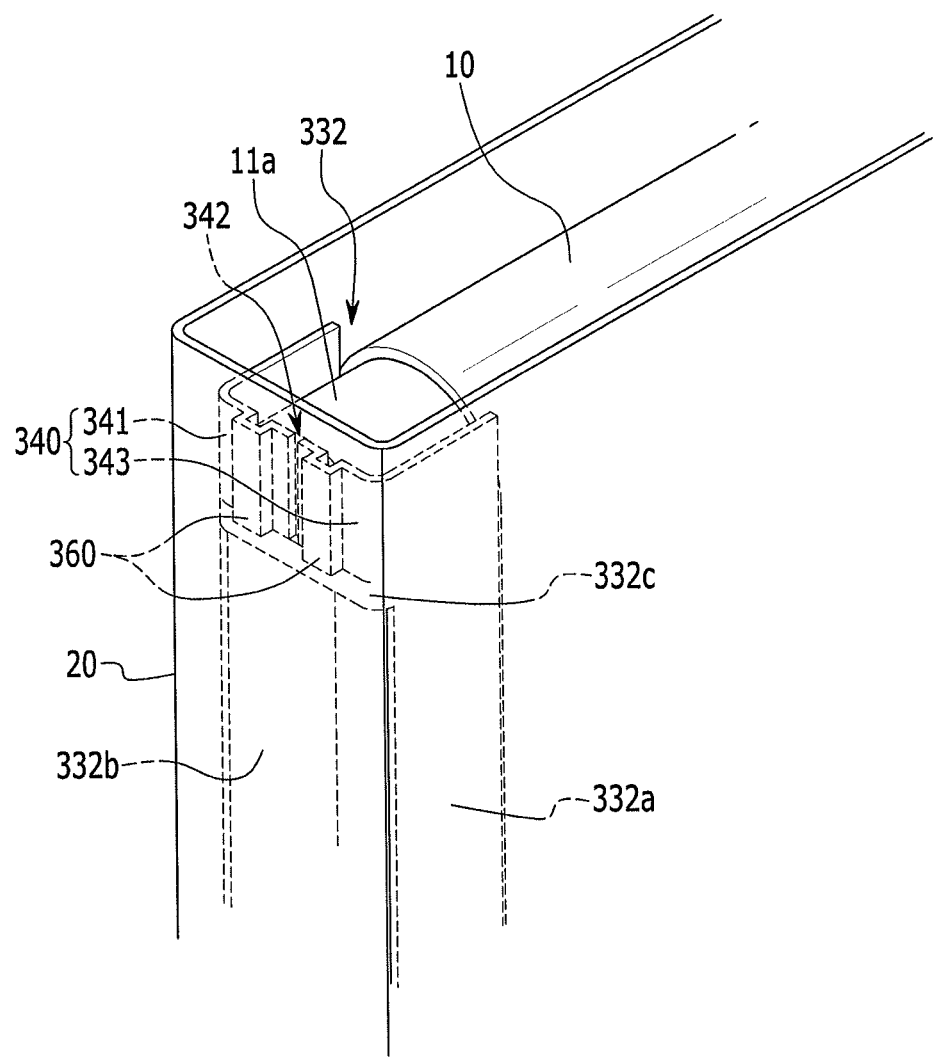
FIG. 8 illustrates a partial perspective view of a state in which a positive current collecting plate, according to a fourth exemplary embodiment, is combined with a case by a welded protrusion.
Figure 9:
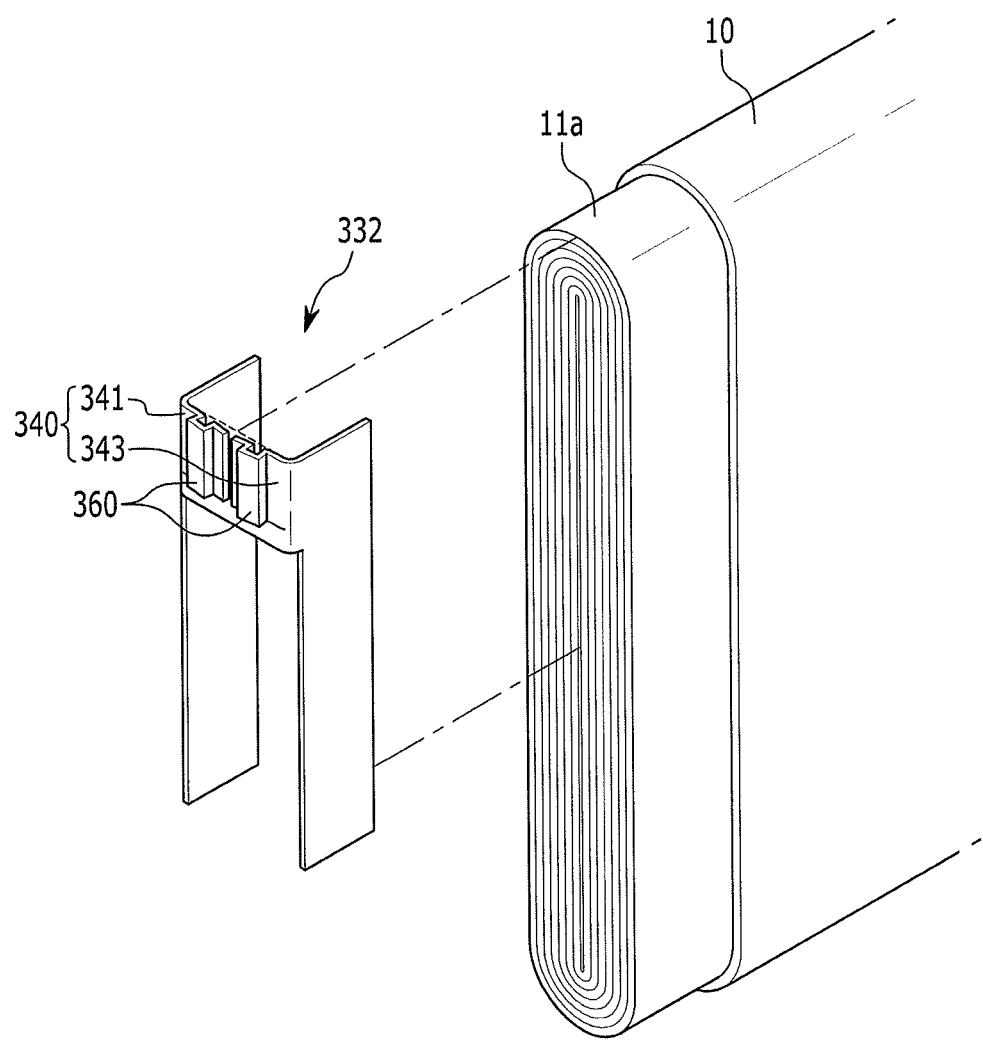
FIG. 9 illustrates a partial exploded perspective view of a state in which a welded protrusion protrudes from the positive current collecting plate of FIG. 8.

FIG. 8 illustrates a partial perspective view of a rechargeable battery according to a fourth exemplary embodiment, in which a welded protrusion of a positive current collecting plate is coupled with a case. FIG. 9 illustrates a partial exploded perspective view of the rechargeable battery illustrated in FIG. 8, in which a welded protrusion protrudes from a positive current collecting plate. Components of the fourth exemplary embodiment having the same reference numerals as the embodiments illustrated in FIG. 1 to FIG. 7 are the same and have the same functions. A description of the same components will not be repeated.

As shown in FIG. 8, in the positive current collecting plate 332, according to the fourth exemplary embodiment, a horizontal third side 332c may extend between and connect first and second longitudinal sides 332a and 332b of the positive current collecting plate 332. The horizontal third side 332c may include an elastic portion 340. The horizontal third side may have a length that is shorter than a length of the first and second longitudinal sides 332a and 332b. The horizontal third side 332c may extend substantially perpendicular to the first and second longitudinal sides 332a and 332b. The horizontal third side 332c may include an elastic portion 340. The elastic portion 340 may be partially detached from the horizontal third side 332c. As such, the elastic portion 340 may be elastic or moveable with respect to the horizontal third side 332c. An outer surface of the elastic portion 340 may face the inner wall of the case 20.

In further detail, the elastic portion 340 may include a first portion 341 and a second portion 343. A gap 342 may be between the first portion 341 and the second portion 343. A welded protrusion 360 may protrude from the surfaces of the first portion 341 and the second portion 343, respectively.

As shown in FIG. 9, the welded protrusion 360 may be formed by bending the first portion 341 and the second portion 343. Although the welded protrusion 360 on the first portion 341 and the second portion 343 is shown to be quadrangular, e.g., rectangular or square-shaped, the welded protrusion 360 may have a triangular or arc-shape.

The first portion 341 and the second portion 343 may protrude toward the inner wall of the case 20. As such, when the positive current collecting plate 332 is installed inside the case 20, the first portion 341 and the second portion 343 are pressed against the inner wall direction of the case 20 by an elastic force, which facilitates closer contact between the welded protrusions 360 and the inner wall of the case 20. Accordingly, welding problems may be prevented or minimized when performing the laser welding process.

By way of summation and review, the temperature inside the rechargeable battery typically increases during electricity generation, so an appropriate heat emission means for cooling the rechargeable battery is required. Generally, however, the heat emission means requires additional elements, which increase production cost.

In contrast, one or more embodiments may provide a rechargeable battery having a positive current collecting plate that is welded to the inner wall of the case to facilitate emission of heat generated by the rechargeable battery to the outside, thereby maximizing the heat emission efficiency of the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode, a second electrode, and a separator provided between the first electrode and the second electrode;
   a first current collecting plate electrically connected to the first electrode;
   a second current collecting plate electrically connected to the second electrode; and
   a case including the electrode assembly, the first current collecting plate, and the second current collecting plate, the case having a length direction and a width direction, the first current collecting plate being electrically connected to an inner wall of the case, wherein:
   the first current collecting plate includes a plurality of spaced protrusions extending along the length direction and welded with the inner wall of the case, adjacent protrusions being spaced apart by a groove in contact with the first electrode, each of the protrusions establishing electrical contact between the first current collecting plate and the case, each of the protrusions made of a heat-conducting material, and each ones of the protrusions transfers heat generated inside the case to outside the case through a path that passes through areas where the protrusions contact the inner wall of the case.

2. The rechargeable battery as claimed in claim 1, wherein the at least two welded protrusions have a same shape.

3. The rechargeable battery as claimed in claim 1, wherein at least one of the welded protrusions includes a bend in the first current collecting plate, the bend protruding toward the inner wall of the case.

4. The rechargeable battery as claimed in claim 1, wherein each of the welded protrusions has a cross-section having a square, triangular, or circular shape.

5. The rechargeable battery as claimed in claim 1, wherein
the first electrode is a positive electrode, and
the second electrode is a negative electrode.

6. The rechargeable battery as claimed in claim 1, wherein the inner wall is a side wall of the case.

7. The rechargeable battery as claimed in claim 1, wherein a first protrusion is spaced from a second protrusion by a gap.

8. The rechargeable battery as claimed in claim 1, wherein at least one of the protrusions is elastically biased in a direction toward the inner wall of the case.

9. The rechargeable battery as claimed in claim 1, wherein
the first current collecting plate includes an elastic portion, the elastic portion being partially detached with respect to a remaining portion of the first current collecting plate, and
at least one of the protrusion protrudes from a surface of the elastic portion, the at least one protrusion being attached to the inner wall of the case.

10. The rechargeable battery as claimed in claim 9, wherein the elastic portion includes:
a first portion that is incised on a side of the first current collecting plate and that protrudes in the inner wall direction of the case;
a second portion that is incised on a side of the first current collecting plate at a position near the first portion and that protrudes in the inner wall direction of the case; and
the at least one protrusion protrudes at the surfaces of the first portion and the second portion.

11. The rechargeable battery as claimed in claim 10, wherein the at least one protrusion includes a bend in the first portion and the second portion, the bend protruding toward the inner wall of the case.

12. The rechargeable battery as claimed in claim 9, wherein the at least one protrusion has a cross-section having a square, triangular, or circular shape.

13. The rechargeable battery as claimed in claim 9, wherein the elastic portion is movable with respect to a remaining portion of the first current collecting plate.

14. The rechargeable battery as claimed in claim 1, wherein:
spaces between the protrusions establish first passages in a third direction,
spaces aligned with the protrusions establish second passages in the third direction,
the first passages face a first direction,
the second passages face a second direction opposite to the first direction, and
the third direction crosses the first and second directions.

15. The rechargeable battery as claimed in claim 14, wherein:
the first direction faces the inner wall of the case, and
the second direction faces the electrode assembly.

16. The rechargeable battery as claimed in claim 1, further comprising:
a plurality of welds,
wherein each of the welds extends through the inner wall of the case to contact and join to a respective one of the protrusions.

17. The rechargeable battery as claimed in claim 16, wherein:
each of the protrusions transfers heat generated inside the case to outside the case through a path that passes through a respective one of the welds that extend through the inner wall of the case.

* * * * *